United States Patent [19]

Mello

[11] 3,823,644

[45] July 16, 1974

[54] SWIVEL HEAD ASSEMBLY FOR FIVE AXIS MACHINE TOOL

[75] Inventor: William R. Mello, Westminster, Calif.

[73] Assignee: Colt Industries Operating Corp., West Hartford, Conn.

[22] Filed: Jan. 30, 1973

[21] Appl. No.: 328,095

[52] U.S. Cl. .................. 90/17, 90/13 R, 408/236
[51] Int. Cl. ........................... B23c 1/12, B23c 1/16
[58] Field of Search ....... 90/17, 13 R; 408/236, 237

[56] References Cited
UNITED STATES PATENTS

| | | | |
|---|---|---|---|
| 2,310,870 | 2/1943 | Retterath | 408/237 X |
| 3,232,141 | 2/1966 | Swanson et al. | 408/237 X |
| 3,359,861 | 12/1967 | Johnson et al. | 90/27 |

FOREIGN PATENTS OR APPLICATIONS

| | | | |
|---|---|---|---|
| 563,065 | 9/1923 | France | 90/17 |

*Primary Examiner*—Gil Weidenfeld
*Attorney, Agent, or Firm*—Radford W. Luther; Richard A. Dornon

[57] ABSTRACT

A five axis profiler has swivel head assembly attached to a vertical slide. The swivel head assembly includes a support, a first rotary slide mounted upon the support for rotation about a first axis, a second rotary slide mounted upon the second rotary slide for rotation about a second axis which crosses the first axis intermediate the respective rear and front ends of the first and second rotary slides to define an acute angle, and a spindle head fixedly secured to the second rotary slide. The spindle head may be rotatably positioned by rotating the first rotary slide and may be tilted by simultaneously rotating the first and second rotary slides in opposite directions. Worm gear arrangements are provided for rotating the rotary slides.

4 Claims, 9 Drawing Figures

FIG. 1

FIG_2

FIG_6

SWIVEL HEAD ASSEMBLY FOR FIVE AXIS MACHINE TOOL

BACKGROUND OF THE INVENTION

This invention relates to machine tools for contouring metal objects, and more particularly to five axis profilers.

Certain existing five axis machine tools do not possess the necessary rigidity to contour a metal object to exacting specifications. In addition, many existing five axis machine tools are relatively complex in that they incorporate a large number of parts. Moreover, many of such machine tools do not furnish adequate space to mount a heavy duty spindle drive mechanism without excessive overhang or interference with the workpiece.

Also, prior art swivel head assemblies do not readily lend themselves to retrofit applications whereby an existing three axis machine tool is converted into a five axis machine tool. It would be more desirable from a cost standpoint to convert an existing three axis machine tool to a five axis machine tool than to purchase a new five axis machine when the utilization of such a machine is mandated.

SUMMARY OF THE INVENTION

The invention provides a swivel head assembly which has the inherent stiffness, necessary for economical machining of complex shapes, and requires a minimum number of parts. In addition, a swivel head assembly of the invention allows for the incorporation of a heavy duty spindle drive mechanism without a resulting excessive overhang or interference with a workpiece.

A swivel head assembly of the invention is well-suited to being mounted upon a conventional three axis machine tool. In this latter regard, two or more identical swivel head assemblies may be mounted upon a moving slide in adjacent relationship.

A swivel head assembly of the invention includes a support for attachment to a moving primary slide, such as a vertical slide, and two rotary slides, a spindle head being connected to the rotary slide remote from the primary slide. The first rotary slide is mounted upon the support for rotation about a first axis, and the second rotary slide is mounted upon the first rotary slide for rotation about a second axis which crosses the first axis at a location intermediate the respective rear and front ends of the first and second rotary slides to define an acute angle.

In accordance with another feature of the invention, the spindle head nose is spaced from the first axis a distance sufficient to avoid interference between the rotary slides and a workpiece.

Accordingly, it is a primary object of the invention to provide a swivel head assembly for a machine tool which has inherent stiffness and incorporates a minimum number of parts.

Another object is to provide a swivel head assembly for a machine tool which encounters minimum interference with a workpiece.

A further object is to provide a swivel head assembly adapted to accommodate a heavy duty spindle drive mechanism.

A still further object is to provide a swivel head assembly which may be plurally mounted upon a moving slide to obtain small center distances.

These and other objects and advantages of the invention will become more readily apparent from the following detail description taken in conjunction with the accompanying drawings in which:

DETAILED DESCRIPTION OF PREFERRED EMBODIMENT

Figure 1:
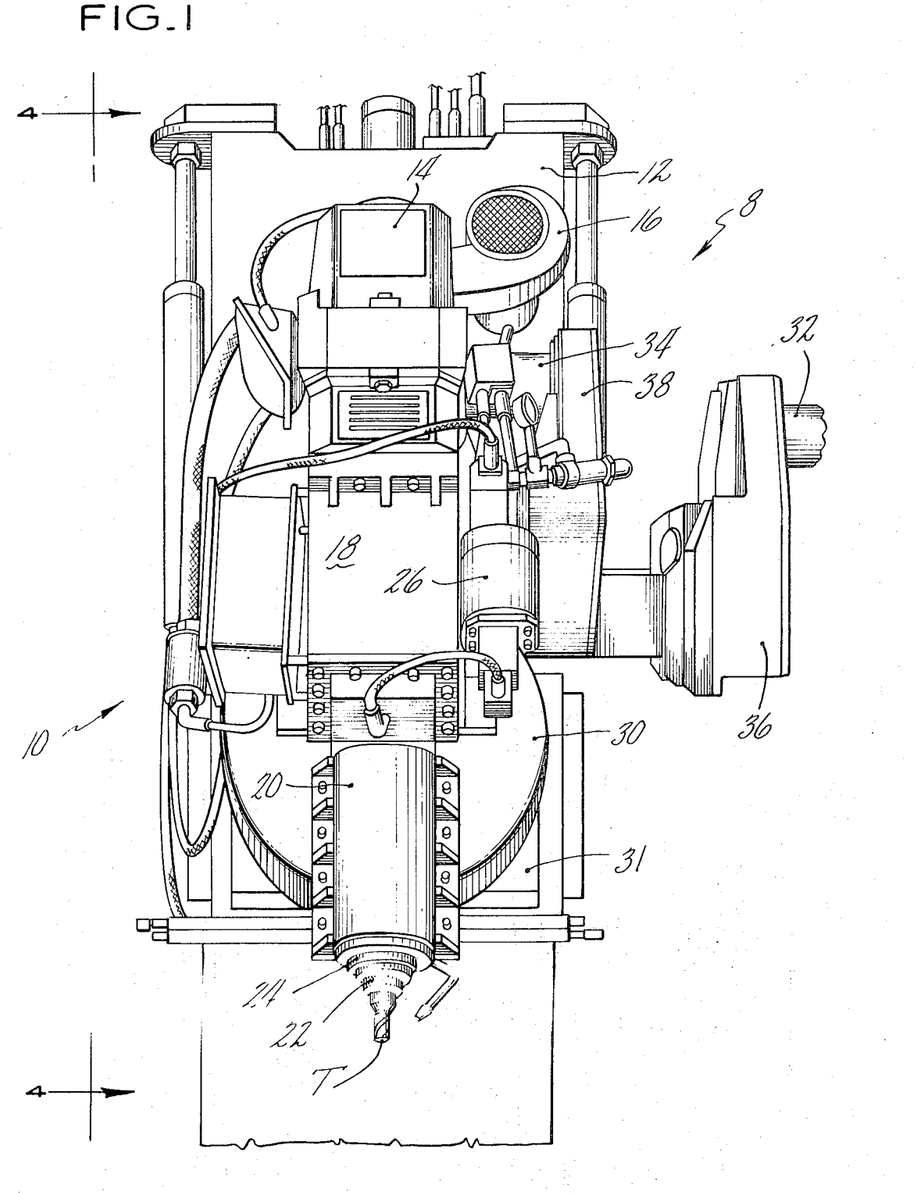
FIG. 1 is a front elevational view of a swivel head assembly of the invention at maximum forward tilt.

In FIG. 1, there is shown a swivel head assembly, generally designated at 8, carried by a vertical slide 12 of a conventional three axis machine tool (not shown). In such a machine tool, the vertical slide would typically be supported upon a horizontal slide movable in a first direction, the horizontal slide being mounted upon another horizontal slide movable in a second direction orthoganal to the first direction. Thus, the machine partially shown in FIG. 1 is a five axis machine tool, commonly known as a five axis profiler.

Figure 2:
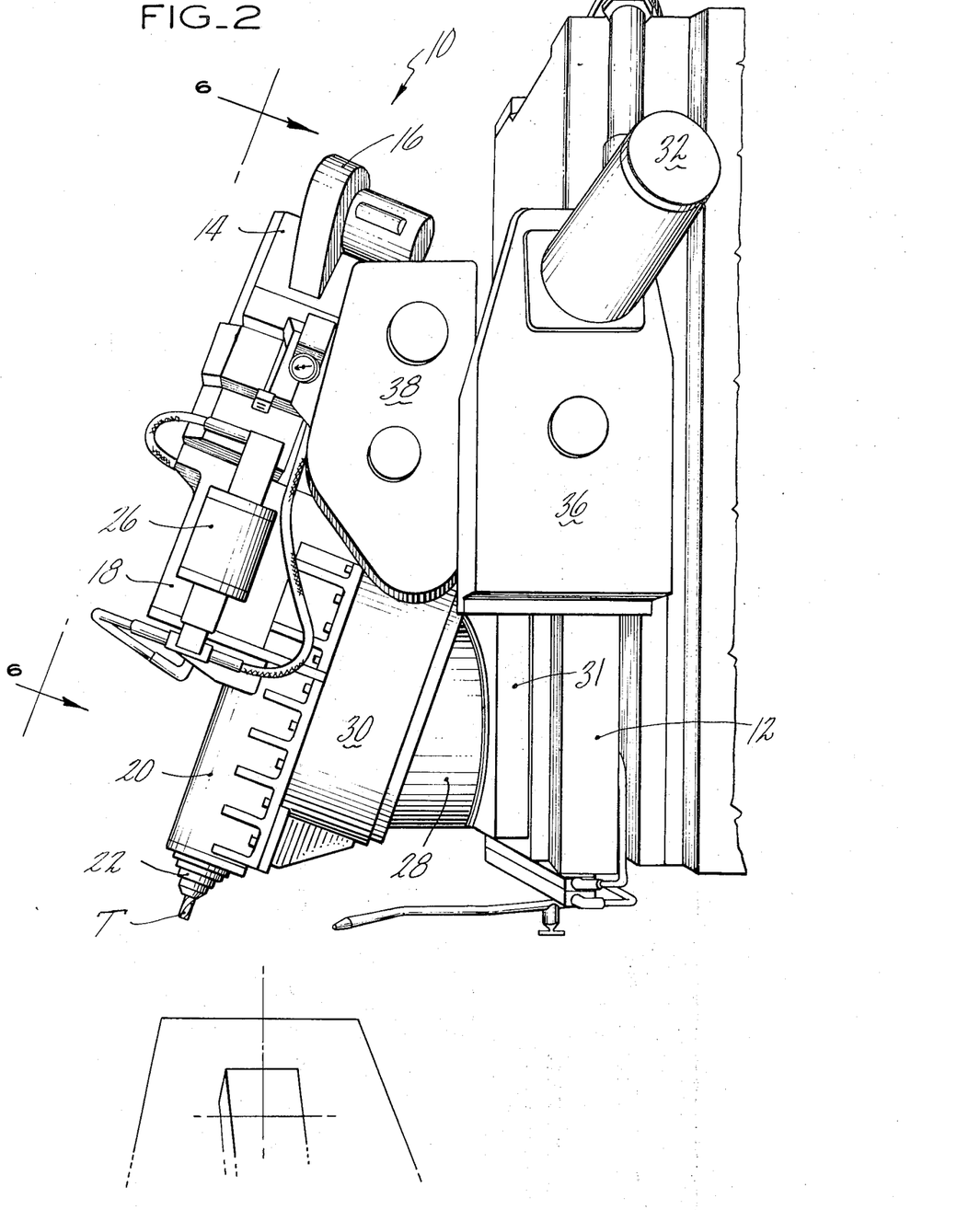
FIG. 2 is a right perspective side view of the swivel head assembly of FIG. 1.
Figure 3:
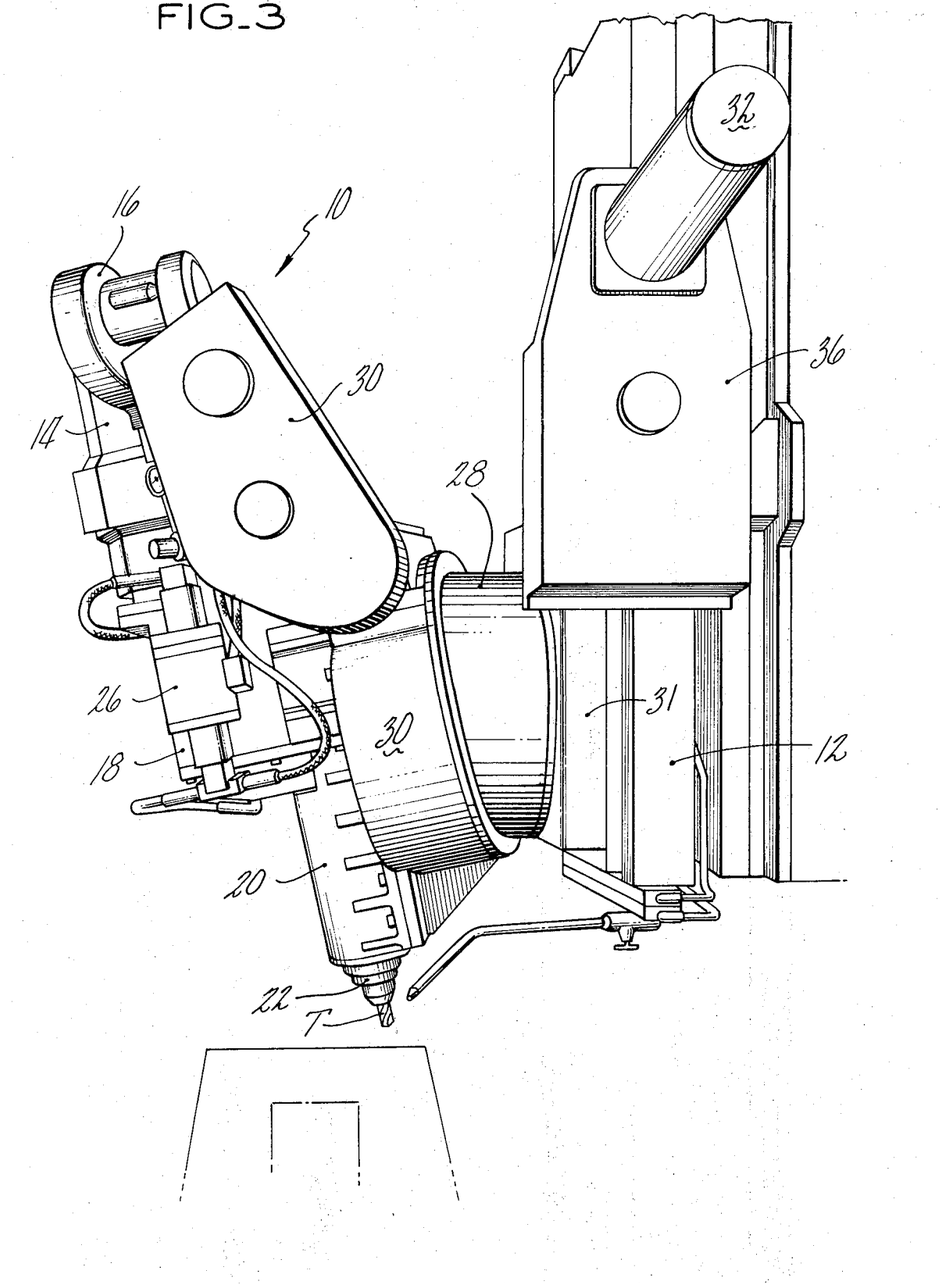
FIG. 3 is a perspective side view, similar to that of FIG. 2, with the swivel head assembly at maximum rearward tilt.

With reference to FIGS. 1, 2 and 3, a spindle head 10 is generally constituted as follows. A DC motor 14, which is cooled by a fan 16, is drivingly connected to a gear box 18. The gear box 18 abuts a spindle housing 20 and has its output shaft (not shown) coupled to spindle 22 to impart rotation thereto. A vertically positionable quill is mounted within the spindle housing 20, and a power draw bar (not shown) secures a tool T to the spindle 22. A motor driven pump unit 26 furnishes a lubricating flow to the gear box 18. The spindle head 10 is positioned by a first rotary slide 28 which rotatably supports a second rotary slide 30. The first rotary slide 28 is mounted for rotation upon a support 31 which is fixedly secured to slide 12. The second rotary slide 30 functions as the mounting surface for the spindle head 10, the spindle head 10 being fixedly secured thereto.

The first and second rotary slides 28 and 30 are rotatably indexed, jointly or severally, by means of DC motors 32 and 34, via respective gear trains. At this point, it will suffice to note that motor 32 positions rotary slide 28, whereby when motor 34 is inactive, the tool T retained by the spindle is also rotated, and that running of the motors 32 and 34, which is calculated to rotate the slides 28 and 30 in opposite directions, occasions a tilting of the spindle head 10 as can be more fully appreciated from the ensuing discussion of FIGS. 5–8. The DC motors 32 and 34 are respectively connected to gear boxes 36 and 38 which contain the associated gear trains referred to above. The gear boxes are, in turn, connected to respective worm gear assemblies, as is discussed more fully hereinafter. It should be noted that the gear box 36 is fixedly connected to the support 31 for the first rotary slide 28 so that it always remains in a fixed position relative to vertical slide 12, but that gear box 38 is fixedly connected to the second rotary slide 30 so as to be movable therewith.

Figure 4:
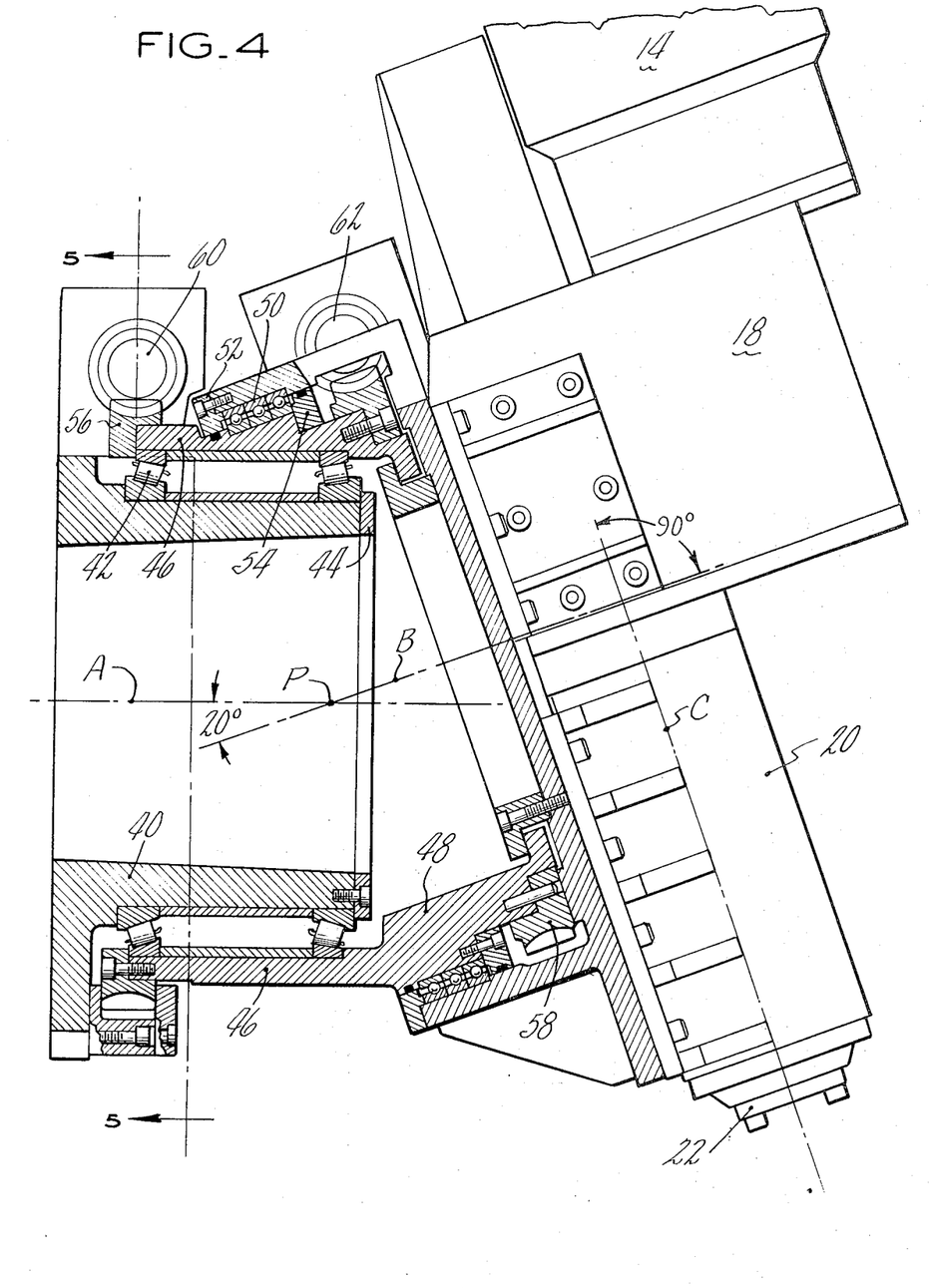
FIG. 4 is a fragmentary, left side view, partly in section, of the swivel head assembly, per se, taken along the line 4—4 of FIG. 1.

Turning now to FIG. 4, the structural relationship between the rotary slides 28 and 30 and the support 31 is illustrated in detail, together with the worm gear assemblies. The support 31 comprises a generally cylindrical extension 40 which serves to mount the first rotary slide 28 for rotation about a first axis, designated A, this axis coinciding with the axis of the cylindrical extension 40. Tapered roller bearings 42 are interposed between extension 40 and the rear portion 46 of slide 28 to furnish a rigid support for the slide and hence the spindle head 10. Bearings 42 are maintained in position by a retainer 44 bolted to the front face of extension 40. It will be appreciated from FIG. 4, in conjunction with FIGS. 2 and 3, that the rear portion 46 of the first rotary slide 28 is wedge-shaped in that it generally defines a truncated right circular cylinder. The outer peripheral surface of the front portion 48 of extension 40 is similar to that of the rear portion 46 inasmuch as it defines a surface of revolution, but it is to be noted that the axis, designated B, of the front portion 48 is inclined at an acute angle to the axis A, the axes crossing intermediate the respective front and rear ends of rotary slides 28 and 30. This angle is preferably about 20° because of structural considerations and since it is desirable to subject hydraulic, lubrication, air, coolant and electrical lines to limited angular movements so that they may extend between the vertical slide 12 and the spindle head 10. The second rotary slide 30 is mounted upon the outer surface of the front portion 48 by means of a row of ball bearings 50 for rotation about the B axis. Bearing retainers 52 and 54, respectively bolted to second rotary slide and the first rotary slide, confront the opposite sides of the bearing row 50.

Figures 5, 9:
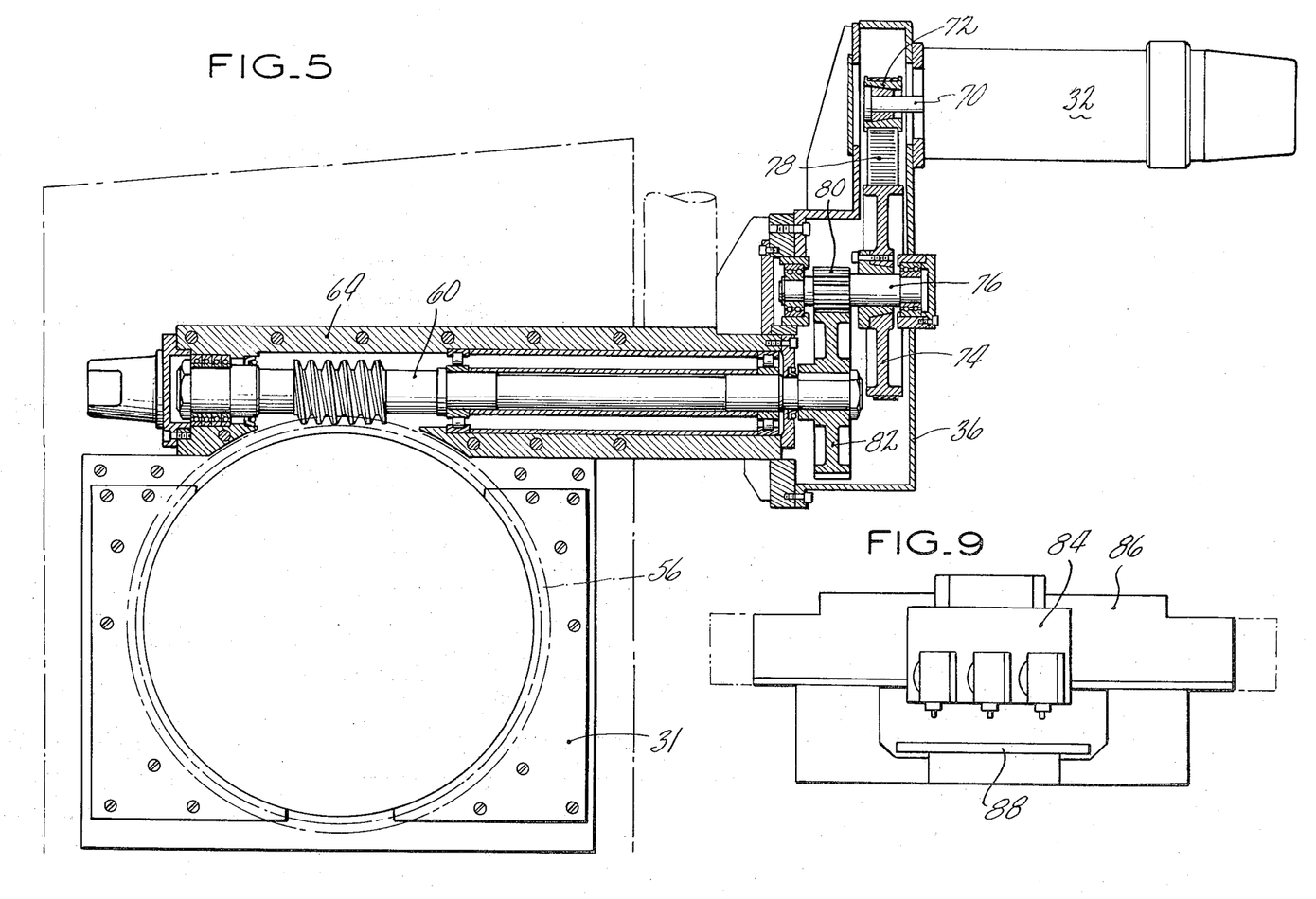
FIG. 5 is an elevational, sectional view of the swivel head assembly, taken along the line 5—5 of FIG. 4.
FIG. 9 shows a plurality of swivel head assemblies mounted upon the vertical slide of a three axis machine tool.
Figure 6:
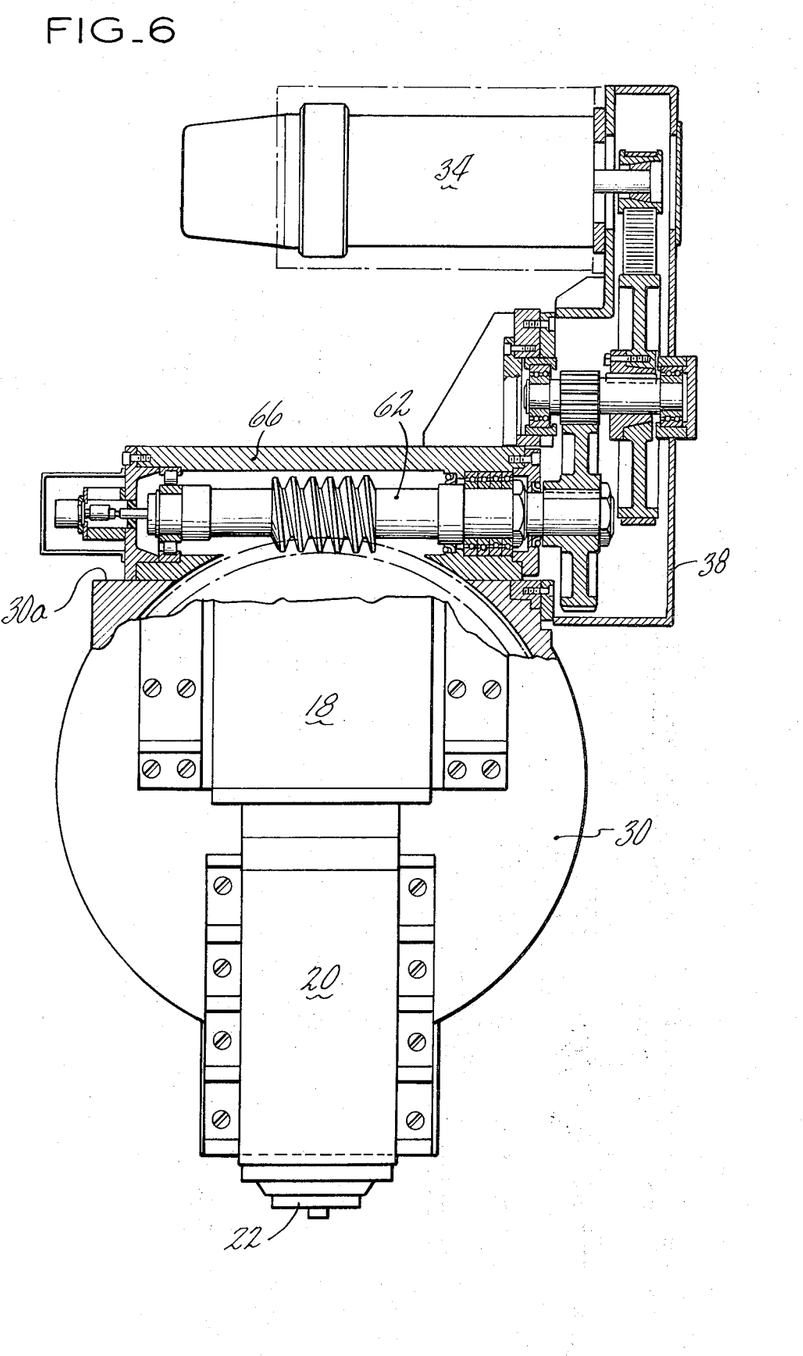
FIG. 6 is a front elevational view, partly in section, of the swivel head assembly, taken along the line 6—6 of FIG. 2.

First and second worm gears 56 and 58 are respectively rigidly connected to the front and rear surfaces of the first rotary slide 28 in coaxial relationship with the rear and front portions 46 and 48. As shown in FIGS. 4–6, worms 60 and 62 respectively mesh with the worm gears 56 and 58 to rotate the first rotary slide 28 and to rotate the second rotary slide 30 with respect to the first rotary slide 28. The worm 60 is mounted for rotation within a housing 64 which is secured to the vertical slide 12 and the support 31. Also, the housing 64 furnishes support for the gear box 36 which is mounted thereupon. The second worm gear 62 is similarly mounted for rotation within a housing 66 which is rigidly connected to the second rotary slide 30 at its upper surface 30a. The gear box 38 is fastened to the housing 66 and the second rotary slide 30 such that these elements together with spindle head 10, second rotary slide 30, and motor 34 constitute a rigid body which is adapted to rotate about the B axis during the running of motor 34.

As depicted in FIG. 5, the motor 32 has an output shaft 70, to which is coaxially mounted a pulley 72. Pulley 72 drives a larger diameter pulley 74, mounted upon a shaft 76, through an interconnecting timing belt 78. A small diameter gear 80 is carried upon the shaft 76 so as to mesh with a large diameter gear 82 which is secured to the worm 60. With reference to FIG. 6, it will be noted that a similar gear train is incorporated within gear box 38 to transmit motion from the output shaft 84 of motor 34 to the worm 62.

Figure 7:
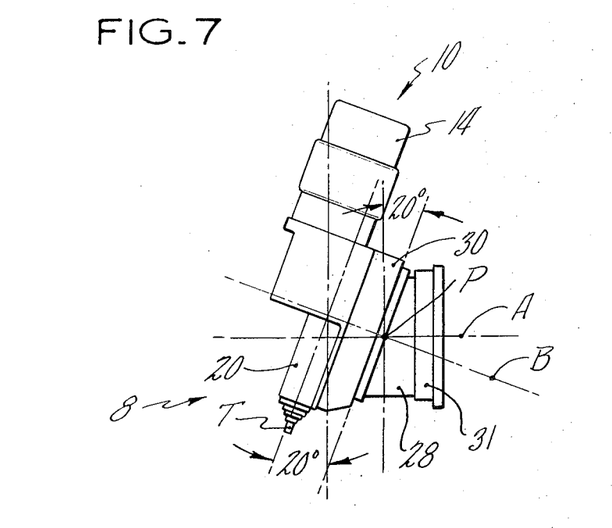
FIGS. 7 and 8 are diagrammatic side views of the swivel head assembly, respectively showing the geometrical relationships between the axes of the rotary slides and the spindle head at maximum forward tilt and maximum rearward tilt.
Figure 8:
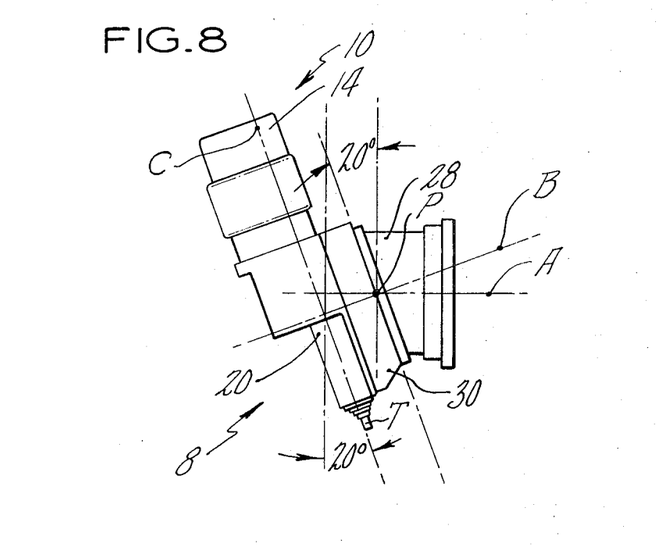

An understanding of the operation of the swivel head assembly 8 is facilitated by reference to FIGS. 7 and 8. In FIG. 7, the first rotary slide 28 occupies its 0° index position (as referenced to support 31), and the second rotary slide 30 occupies its 0° index position (as referenced to the first rotary slide 28). The axes A, B and C all lie in a common vertical plane. Disregarding for the moment the spindle head 10 and the second rotary slide 30, it will be noted that a 360° rotation of the first rotary slide 28 causes axis B to generate a conical surface having an apex at point p. Assuming a clockwise rotation of the first rotary slide 28, at the 90° index position of first rotary slide 28, axes B and A lie in a common horizontal plane. Similarly, at the 270° index position of first rotary slide 28, axes B and A lie in the same common horizontal plane with the axis B on the other side of the axis A. In FIG. 8, the first rotary slide is disposed in its 180° index position with axes B and C in a common vertical plane.

A counterclockwise rotation of the second rotary slide 30 from its 0° index position together with a simultaneous clockwise rotation of the first rotary slide 28 from its 0° index position produces a tilting movement of the spindle head axis C such that when both rotary slides 28 and 30 arrive at their respective 90° index positions, axis C, and hence spindle head 10, is vertically positioned. In like manner, when the slides are at their 270° index positions, axis C is vertical. When both rotary slides occupy their 180° index positions, the swivel head assembly 8 assumes the configuration of FIG. 8. A comparison of FIGS. 7 and 8 reveals that in FIG. 7, when the first and second rotary slides 28 and 30 are in the 0° index positions, the spindle head 10 is tilted forwardly 20° with respect to the vertical, and that in FIG. 8, when the first and second rotary slides are in the 180° index positions, the spindle head 10 is tilted rearwardly 20°. Hence, spindle head 10 is positionable with respect to the vertical within a range of 40°.

Rotation of the spindle head 10 about the A axis is achieved by running motor 32 (with motor 34 at rest) so as to occasion either a clockwise or counterclockwise rotation of the first rotary slide 28. The angular range of such rotation may, if desired, be limited by conventional travel limit switches to ±20° in order to correspond to the maximum forward and rearward tilt of the spindle head 10, whereby the axis C can be laterally tilted ±20°. This lateral tilt could, of course, be extended to the practical machining limit of ±90° if mandated by the selected application.

FIG. 9 illustrates an arrangement wherein a plurality of swivel head assemblies are mounted in juxtaposed staggered fashion upon a vertical slide 84 movable in the vertical direction. The vertical slide 84 is mounted upon a bridge 86 which is horizontally movable between the phantom positions. A table 88, adapted to support a workpiece beneath the assemblies, is movable in a horizonal direction (perpendicular to the plane of the paper). The five axis machine depicted in FIG. 9 allows for advantageous short center distances which enhance the versatility of a five axis machine tool.

Obviously many modifications are possible in light of the above teachings without departing from the scope or spirit of the invention as defined in the appended claims. For example, if a reduced overhang weight is desired, the spindle 22 may be driven by a gear train, incorporating three sets of bevel gears, which extends through the vertical slide 12 and the swivel head assembly 8. 8.

I claim:

1. In a multi-axis machine tool having a movable vertical slide, the combination of:
    a first rotary slide mounted upon the vertical slide for rotation relative thereto about a first axis;
    a second rotary slide mounted upon the first rotary slide for rotation relative thereto about a second axis such that the first and second axes cross intermediate the respective rear and front ends of the first and second rotary slides to define an acute angle;
    a spindle head adapted to hold a tool secured to the second rotary slide such that a tool held by the head is radially spaced from the first axis a distance greater than that of the periphery of the front end of the first rotary slide so as to minimize interference with workpieces; and
    means to independently rotate the first and second rotary slides about the first and second axes comprising:
    a first worm gear fixedly connected to the rear portion of the first rotary slide;
    a first worm mounted upon the vertical slide in fixed relationship thereto in meshing engagement with the first worm gear;
    a second worm gear fixedly connected to the front portion of the first rotary slide; and
    a second worm mounted upon the second rotary slide in fixed relationship thereto in meshing engagement with the second worm gear.

2. The combination of claim 1, further including:
    a support fixedly connected to the vertical slide for mounting the first rotary slide thereupon; and
    bearing means interconnecting the support and the first rotary slide.

3. The combination of claim 1, wherein the spindle head comprises:
    a motor for rotating the tool.

4. The combination of claim 1, wherein the rear portion of the first rotary slide generally defines a truncated right circular cylinder having an axis coincident with the first axis, and wherein the front portion of the first rotary slide generally defines a surface of revolution having an axis coincident with the second axis.

* * * * *